(12) United States Patent
Bendapudi et al.

(10) Patent No.: US 8,104,019 B2
(45) Date of Patent: Jan. 24, 2012

(54) DEBUGGING IN AN OPERATING SYSTEM WITH MULTIPLE SUBSYSTEMS

(75) Inventors: Perraju Bendapudi, Hyderabad (IN);
Rajesh Jalan, Hyderabad (IN);
Siddharth Rana, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1446 days.

(21) Appl. No.: 11/278,339

(22) Filed: Mar. 31, 2006

(65) Prior Publication Data
US 2007/0240115 A1  Oct. 11, 2007

(51) Int. Cl.
*G06F 9/44* (2006.01)
(52) U.S. Cl. .................. 717/124; 717/127; 717/129
(58) Field of Classification Search .................. None
See application file for complete search history.

(56) References Cited

U.S. PATENT DOCUMENTS

| | | | | |
|---|---|---|---|---|
| 5,450,586 A * | 9/1995 | Kuzara et al. | ............... | 717/124 |
| 5,548,717 A * | 8/1996 | Wooldridge et al. | ......... | 717/124 |
| 5,632,032 A * | 5/1997 | Ault et al. | ............... | 718/100 |
| 5,901,315 A * | 5/1999 | Edwards et al. | ............... | 717/124 |
| 5,953,530 A * | 9/1999 | Rishi et al. | ............... | 717/127 |
| 6,272,518 B1 * | 8/2001 | Blazo et al. | ............... | 718/102 |
| 6,324,683 B1 * | 11/2001 | Fuh et al. | ............... | 717/124 |
| 6,988,264 B2 * | 1/2006 | Sarma et al. | ............... | 717/128 |
| 2002/0066071 A1 * | 5/2002 | Tien et al. | ............... | 717/102 |
| 2002/0199173 A1 * | 12/2002 | Bowen | ............... | 717/129 |
| 2006/0015853 A1 * | 1/2006 | Babineau et al. | ............... | 717/127 |

OTHER PUBLICATIONS

"Wine Developers Guide", WineHQ.org, http://web.archive.org/web/20050416023016/www.winehq.org/site/docs/wine-devel/index, Apr. 3, 2005.*
Koopman, Philip and DeVale, John. "The Exception Handling Effectiveness of POSIX Operating System" IEEE Sep. 2000 <http://ieeexplore.ieee.org/stamp/stamp.jsp?tp=&arnumber=877845> 12 pages.*
Lumpp, James, Casavant, Thomas, and Siegel, Howard. "Specification and Identification of Events for Debugging and Performance Monitoring of Distributed Multiprocessor Systems" IEEE 1990 <http://ieeexplore.ieee.org/stamp/stamp.jsp?tp=&arnumber=89317> 8 pages.*
Garvin, Patrick. "Debugging with NTSD and Application Verifier" Oct. 2007 ProQuest Computing <http://proquest.umi.com/pqdweb?index=4&did=1324235401&SrchMode=1&sid=4&Fmt=6& VInst=PROD&VType=PQD&RQT=309&VName=PQD& TS=1320181778&clientId=19649> 5 pages.*

* cited by examiner

*Primary Examiner* — Thuy Dao
*Assistant Examiner* — Samuel Hayim
(74) *Attorney, Agent, or Firm* — Perkins Coie LLP

(57) ABSTRACT

A facility for debugging in an operating system with native and non-native subsystems is described. The facility employs a debugger designed for use with the native subsystem. The debugger receives an indication to debug the application program of the non-native subsystem, attaches to the application program of the non-native subsystem, and when it receives an indication that the application program has started a new process, attaches to an executable component operating in the new process. When the debugger is appropriately configured, the facility attaches to an application program operating on the non-native subsystem rather than a terminal component operating on the native subsystem. When the debugger is appropriately configured, the facility redirects exceptions the debugger receives to the non-native subsystem.

18 Claims, 8 Drawing Sheets

DEBUGGING IN AN OPERATING SYSTEM WITH MULTIPLE SUBSYSTEMS

TECHNICAL FIELD

The described technology is directed to software development, and, more particularly, to debugging software.

BACKGROUND

An operating system performs various tasks relating to a computer system, including managing its hardware and software resources. Hardware resources include processors, primary storage (e.g., memory), secondary storage (e.g., hard disk or optical disk), printers, display adapters, network interface cards, input/output ports, etc. Software resources include application programs, user interfaces, device drivers, network protocol stacks, etc. The operating system manages and coordinates these resources to complete various tasks, such as under the direction of an application program.

Operating systems may provide functionality to application programs using subsystems. A subsystem is an operating system component that implements an operating system's application program interfaces ("APIs"). Subsystems may invoke functions of a kernel component. A kernel component is an operating system component that provides core operating system functions.

An operating system may have multiple subsystems, each exposing different operating system behaviors. As an example, an operating system may implement a portable operating system interface ("POSIX") and a MICROSOFT WINDOWS ("WINDOWS") interface as two separate subsystems. These subsystems may both function on a common operating system. Such an operating system may function both with application programs designed for POSIX and application programs designed for WINDOWS.

Software developers may use tools, such as compilers and debuggers, that are designed for use with one subsystem to design and test software written for another subsystem. As an example, software developers may use MICROSOFT VISUAL STUDIO, which is designed for use with the WINDOWS subsystem, to design and test application programs for POSIX.

A tool called a debugger is commonly employed by software developers to assist them in identifying various software defects. A debugger typically "attaches" to code to be debugged, after which it can be used by a human tester to monitor and control the execution of the debugged code. However, debuggers designed for use with a subsystem have many problems when used to debug application programs written for another subsystem. Three such problems include an inability to automatically attach to the application program being tested, an inability to attach to forked processes, and an inability to properly redirect exceptions. Each of these problems is discussed immediately below.

When a software developer desires to debug an application program, the software developer may start the debugger, identify the application program, and assume that the debugger will attach to the application program. When the debugger is designed for use with a native subsystem (e.g., WINDOWS) but the application program is designed for another subsystem (e.g., POSIX), the debugger attaches to a component that provides a terminal in the environment of the native subsystem. As an example, a POSIX.EXE component provides a terminal for the POSIX subsystem so that POSIX applications can receive input and provide output. When the debugger attempts to attach to a POSIX application program, it attaches to POSIX.EXE instead because, as far as the WINDOWS subsystem is concerned, the application being debugged is POSIX.EXE.

POSIX supports a concept known as forking. When an application program forks, the POSIX subsystem creates a new process that executes the application program. A software developer may desire to debug every forked process concurrently. However, because the debugger of a subsystem is unaware that the application program operating on another subsystem has forked, the debugger will not attach to the forked process.

Various software components may raise "exceptions" when they encounter abnormal conditions. Examples of abnormal conditions may include, e.g., running out of memory, failing to find a file, causing a floating point error of a processor, receiving an illegal instruction, referencing an un-allocated memory page, etc. The application program or other software components may have program logic to detect and handle exceptions. As an example, an application program may attempt to locate a file when a file cannot be found. As another example, a subsystem may indicate to a user to close application programs when memory cannot be allocated to an application program requiring additional memory. When an exception is raised, it may be provided to the debugger. However, an application program being debugged may have logic for handling the exception that the software developer may wish to test. Conventionally, a debugger that is designed to operate with a subsystem is unable to provide the exception to a software application program that is operating on another subsystem.

It would thus be highly desirable to provide a facility for debugging in an operating system with multiple subsystems.

DETAILED DESCRIPTION

Figure 1:
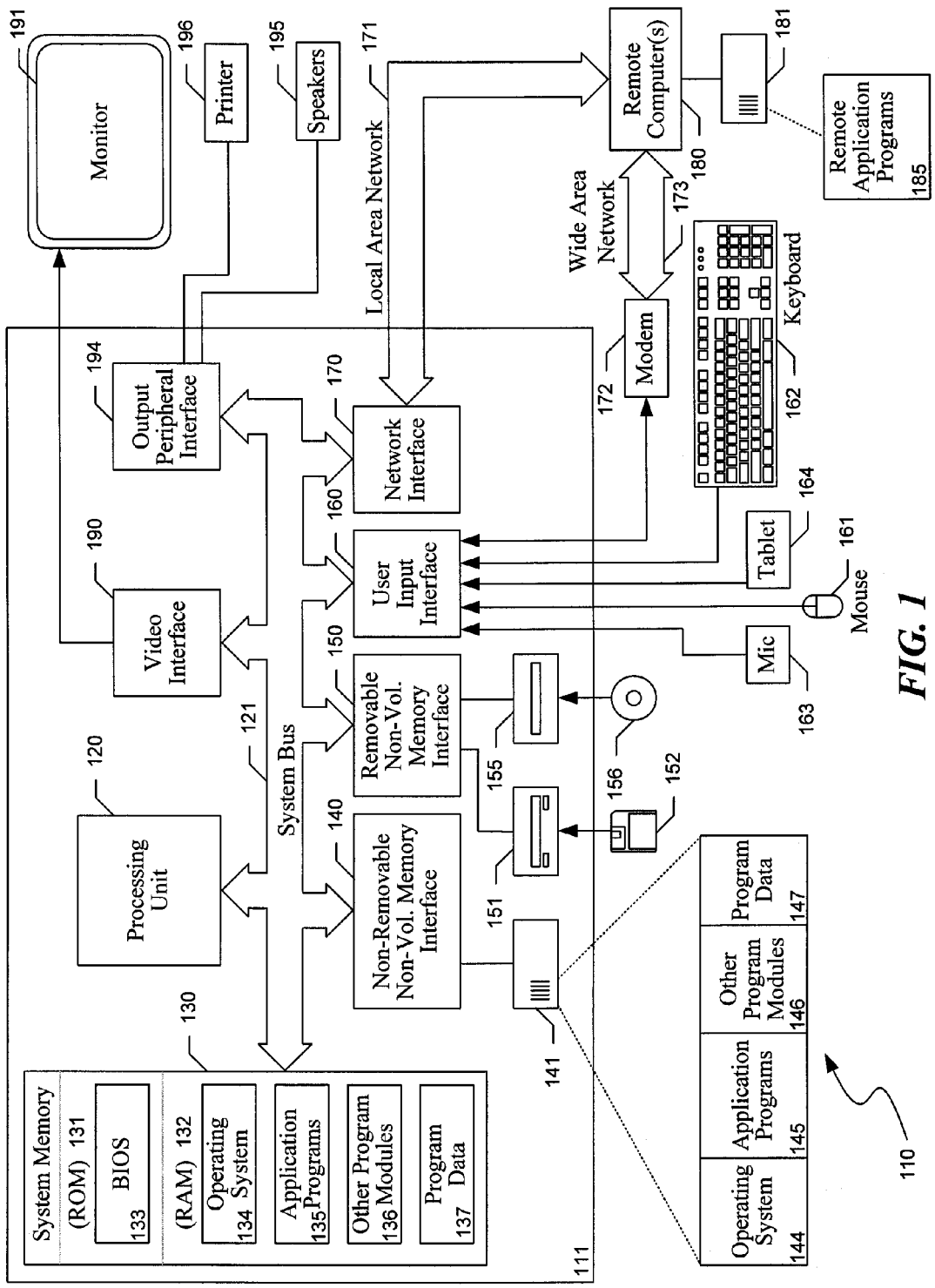
FIG. 1 illustrates an example of a suitable computing system environment or operating environment in which the techniques or facility may be implemented.

A facility is provided for debugging in an operating system with multiple subsystems. In various embodiments, the facility enables a debugger that is designed for use with a subsystem ("native subsystem") to debug an application program that is designed for use with another subsystem. As an example, the facility enables a debugger designed for use with the WINDOWS subsystem (such as MICROSOFT's "windbg" tool or MICROSOFT VISUAL STUDIO's debugger) to debug an application program designed for the POSIX subsystem. An extensibility mechanism of the debugger is employed to extend the debugger by providing an extension component that recognizes additional commands relating to debugging a software application on a subsystem other than the native subsystem of the debugger. As an example, an extension dynamic load library may be added to MICROSOFT windbg. Alternatively, an "add-in" may be added to the MICROSOFT VISUAL STUDIO integrated development environment's debugger. The extension component may recognize commands such as to attach to a POSIX application instead of the POSIX.EXE component, to attach to forked processes, or to route exceptions to the subsystem corresponding to the application program being debugged. When the extension component receives a command that it is configured to accept, the extension component may request the debugger via the debugger's API to add a thread for communicating with a listener thread that is added to the subsystem of the application program being debugged. Because the debugger and the subsystem of the application program being debugged are now capable of communicating with one another, the debugger is adapted for debugging in an operating system with multiple subsystems.

In various embodiments, the extension component is configured to accept a command to attach to a POSIX application instead of a component that provides a terminal interface, such as the POSIX.EXE component. As an example, the extension component may be configured to accept a command from a user, such as "SKIP POSIX." When the extension component receives this command, it may start a thread associated with the debugger ("debugger thread") for communicating with a listener thread of the POSIX subsystem. The listener thread may be added to the POSIX subsystem by the facility for debugging purposes. When the debugger receives a command to launch a POSIX application, the debugger thread notifies the listener thread that the debugger requests notifications relating to the POSIX application being debugged and provides a process identifier ("PID") associated with the POSIX.EXE component with which the debugger originally attached when the debugger started. Later, when the debugger receives a command to continue executing the application program being debugged (generally referred to in many debuggers as a "GO" command), the POSIX.EXE component receives an indication of the POSIX application being debugged. The POSIX.EXE component then requests the POSIX subsystem to start the POSIX application, as it would conventionally. The POSIX subsystem then creates a process for the POSIX application. Upon determining that a process has started for the application program, the listener thread communicates with the debugger thread and provides a PID associated with the newly created process for the POSIX application. The debugger thread then causes the debugger to detach from POSIX.EXE and attach to the new process as identified by the PID provided by the listener thread. In so doing, the debugger attaches to the POSIX application being debugged instead of the POSIX.EXE component.

In various embodiments, the extension component is configured to accept a command to attach to processes that are forked by the process being debugged. As an example, the extension component may be configured to accept a command from a user, such as "FORK DEBUG." When the extension component receives this command, it may start a debugger thread for communicating with a listener thread of the POSIX subsystem. The listener thread may be added to the POSIX subsystem by the facility for debugging purposes. When the POSIX application being debugged issues a fork program instruction, the listener thread notifies the debugger thread of the new process and provides the PID of the new process. The debugger thread then attaches to the newly forked process without detaching from the POSIX application being debugged. The debugger may maintain an indication of relationships between processes being debugged. As an example, the debugger may maintain a hierarchical list of forked processes. The hierarchical list may start with the original application program being debugged as a root of the hierarchy and each forked process as a child of the process that issued the fork instruction. In so doing, the debugger enables an application developer to debug each newly forked process in addition to the originally debugged application program. As an example, the debugger may provide a hierarchical representation of the forked process to the software developer in a user interface, such as in a tree view.

In various embodiments, the extension component is configured to accept a command to route exceptions to a subsystem corresponding to an application program being debugged. As an example, the extension component may be configured to accept a command from a user, such as "REDIRECT EXCEPTIONS." When the extension component receives this command, it may start a debugger thread for communicating with a listener thread of the POSIX subsystem. The listener thread may be added to the POSIX subsystem by the facility for debugging purposes. When the debugger detects an exception, the debugger thread indicates to the listener thread that an exception has been detected and that the debugger will detach and should be requested by the listener thread to reattach after the POSIX subsystem handles the exception. The debugger thread then requests the debugger to detach from the POSIX application being debugged. When the POSIX subsystem receives the exception, the listener thread notifies the debugger thread. The debugger thread then requests the debugger to reattach to the POSIX application. Thus, a software developer can debug logic of the POSIX application for handling exceptions.

Turning now to the figures, FIG. 1 is a block diagram illustrating an example of a suitable computing system environment 110 or operating environment in which the techniques or facility may be implemented. The computing system environment 110 is only one example of a suitable computing environment and is not intended to suggest any limitation as to the scope of use or functionality of the facility. Neither should the computing system environment 110 be interpreted as having any dependency or requirement relating to any one or a combination of components illustrated in the exemplary operating environment 110.

The facility is operational with numerous other general purpose or special purpose computing system environments or configurations. Examples of well-known computing systems, environments, and/or configurations that may be suitable for use with the facility include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The facility may be described in the general context of computer-executable instructions, such as program modules, being executed by a computer. Generally, program modules include routines, programs, objects, components, data structures, and so forth that perform particular tasks or implement particular abstract data types. The facility may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the facility includes a general purpose computing device in the form of a computer 111. Components of the computer 111 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 111 typically includes a variety of computer-readable media. Computer-readable media can be any available media that can be accessed by the computer 111 and includes both volatile and nonvolatile media and removable and nonremovable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 111. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as a wired network or direct-wired connection, and wireless media, such as acoustic, RF, infrared, and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within the computer 111, such as during start-up, is typically stored in ROM 131. RAM 132 typically contains data and/or program modules that are immediately accessible to and/or presently being operated on by the processing unit 120. By way of example, and not limitation, FIG. 1 illustrates an operating system 134, application programs 135, other program modules 136, and program data 137.

The computer 111 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a nonremovable memory interface, such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 111. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 111 through input devices such as a tablet or electronic digitizer 164, a microphone 163, a keyboard 162, and a pointing device 161, commonly referred to as a mouse, trackball, or touch pad. Other input devices not shown in FIG. 1 may include a joystick, game pad, satellite dish, scanner, or the like. These and other input devices are often connected to the processing unit 120 through a user input interface 160 that is coupled to the system bus 121, but may be connected by other interface and bus structures, such as a parallel port, game port, or a universal serial bus (USB). A monitor 191 or other type of display device is also connected to the system bus 121 via an interface, such as a video interface 190. The monitor 191 may also be integrated with a touch-screen panel or the like. Note that the monitor 191 and/or touch screen panel can be physically coupled to a housing in which the computer 111 is incorporated, such as in a tablet-type personal computer. In addition, computing devices such as the computer 111 may also include other peripheral output devices such as speakers 195 and a printer 196, which may be connected through an output peripheral interface 194 or the like.

The computer 111 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 111, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprisewide computer networks, intranets, and the Internet. For example, in the present facility, the computer 111 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 111 is connected to the LAN 171 through a network interface or adapter 170. When used in a WAN networking environment, the computer 111 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 111, or portions thereof, may be stored in the remote memory storage device 181. By way of example, and not limitation, FIG. 1 illustrates remote application programs 185 as residing on memory storage device 181. It will be appreciated that the network connections shown are exemplary and other means of establishing a communications link between the computers may be used.

While various functionalities and data are shown in FIG. 1 as residing on particular computer systems that are arranged in a particular way, those skilled in the art will appreciate that such functionalities and data may be distributed in various other ways across computer systems in different arrangements. While computer systems configured as described above are typically used to support the operation of the facility, one of ordinary skill in the art will appreciate that the facility may be implemented using devices of various types and configurations, and having various components.

The techniques may be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2:
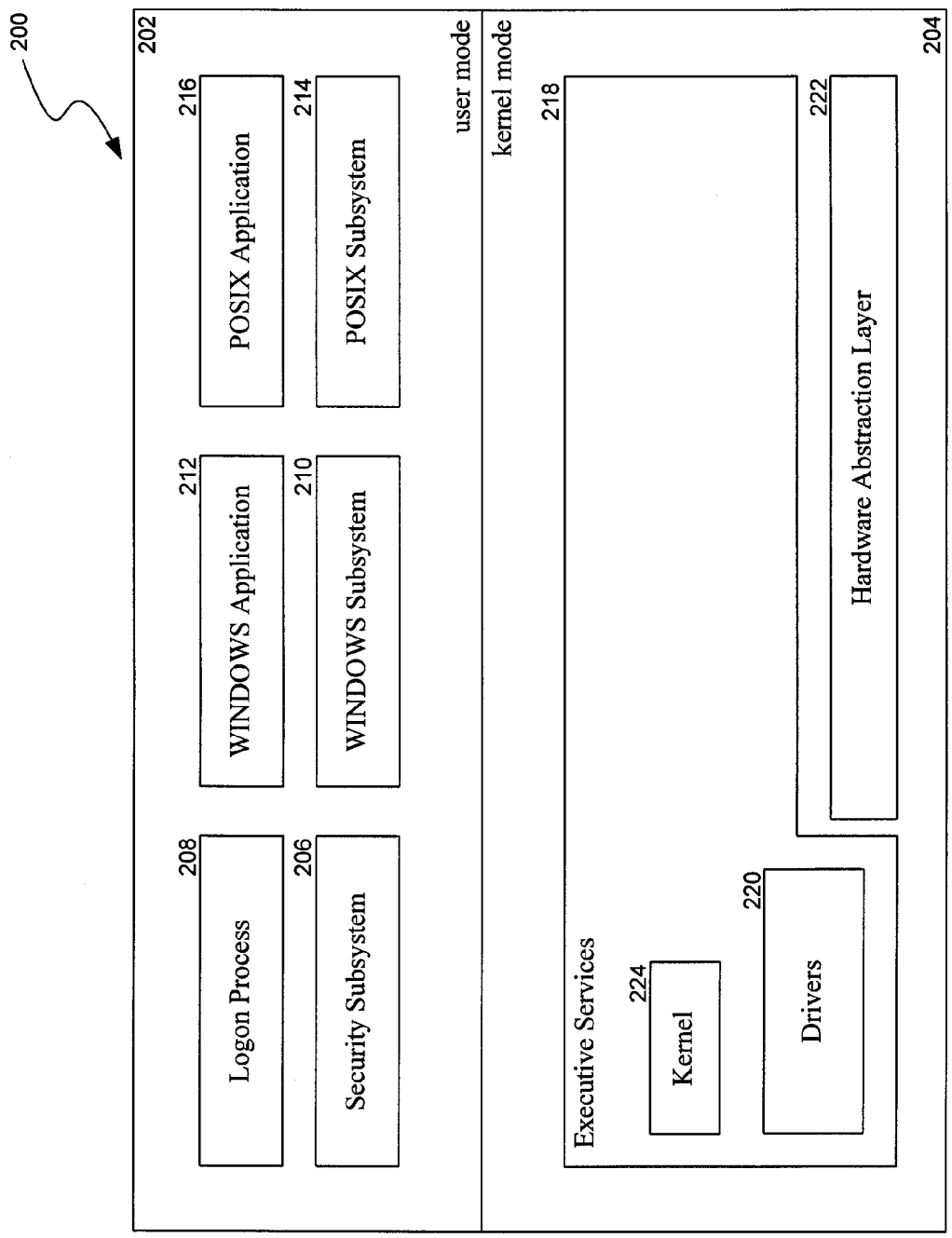
FIG. 2 is a block diagram illustrating components of an operating system.

FIG. 2 is a block diagram illustrating an example of an operating system of the computing environment of FIG. 1. The operating system 200 comprises multiple components operating in a user mode 202 and a kernel mode 204.

Components operating in a user mode include, e.g., a security subsystem 206, logon process 208, WINDOWS subsystem 210, WINDOWS application 212, POSIX subsystem 214, and POSIX application 216.

The security subsystem provides security services to application programs and the operating system. As an example, the security subsystem may provide a logon process 208 and functionality to enable users to log on to the operating system.

The WINDOWS subsystem may provide MICROSOFT WINDOWS functionality to application programs, such as WINDOWS applications. The WINDOWS subsystem may implement an application program interface relating to the MICROSOFT WINDOWS operating system. As an example, the WINDOWS subsystem may receive a request made by a WINDOWS application to an API of the WINDOWS subsystem, perform some activities relating to the request, and call an operating system kernel to perform remaining activities.

The operating system may also have additional subsystems, such as a POSIX subsystem 214. The POSIX subsystem may implement an API relating to an operating system that complies with a POSIX specification. The API may be used by a POSIX application 216 to communicate with the POSIX operating system to perform tasks.

When an operating system comprises multiple subsystems, it is capable of providing multiple varieties of operating systems, such as MICROSOFT WINDOWS and POSIX. Thus, application programs designed for these varieties of operating systems may function on the operating system comprising multiple subsystems.

The subsystems may utilize services provided by an executive services component 218 operating in kernel mode 204. The executive services component may comprise additional components, such as drivers 220 and a kernel 224. The drivers may provide direct communications between various software and hardware components of the system. As an example, a driver may provide communications between software components and a network interface card. The kernel may provide core operating system functions and communications with a processor. As an example, the kernel may schedule thread execution by loading program registers and instructing the processor to begin executing a thread. A hardware abstraction layer 222 may also operate in kernel mode to provide operating system components and interfaces relating to hardware devices. The hardware abstraction layer may enable software components of the operating system to avoid having to provide functionality specific to a particular vendor's hardware device.

Figure 3:
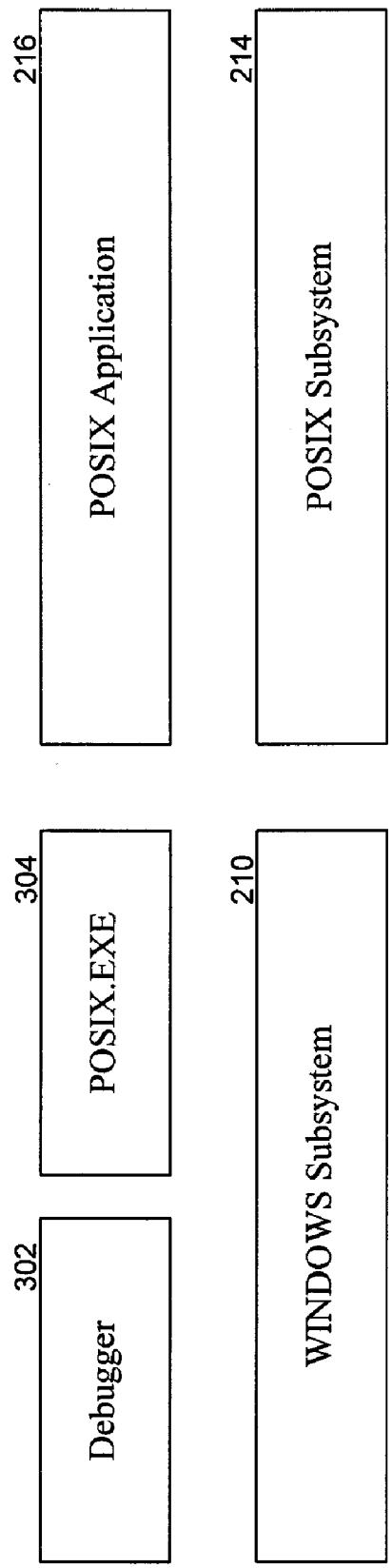
FIG. 3 is a block diagram illustrating components of an operating system.

FIG. 3 is a block diagram illustrating components of an operating system. The operating system may have multiple components that function with subsystems. As an example, multiple application programs may function with the WINDOWS subsystem. Two application programs are shown in FIG. 3 as functioning with the WINDOWS subsystem. These are a debugger 302 and a POSIX.EXE component 304. It is generally known that the WINDOWS subsystem is capable of supporting a large number of application programs that run concurrently. Although the POSIX subsystem is also capable of running a large number of application programs concurrently, only one POSIX application is illustrated in the figure.

Figure 4:
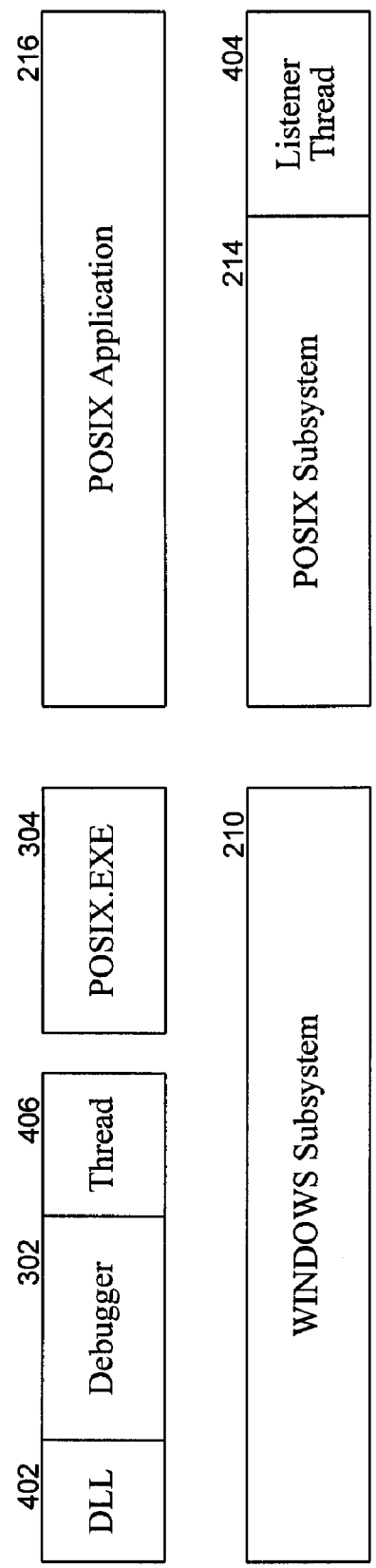
FIG. 4 is a block diagram illustrating components of the facility in relation to the components of the operating system in an embodiment.

FIG. 4 is a block diagram illustrating components of the facility in relation to the components of the operating system in an embodiment. The facility includes an extension component 402 that is associated with the debugger. The extension component may be implemented as a dynamic link library ("DLL") to extend functionality provided by the debugger. As an example, the DLL may extend the MICROSOFT windbg debugger or the MICROSOFT VISUAL STUDIO debugger. The extension component may be implemented as an add-in for the MICROSOFT VISUAL STUDIO debugger. The extension component may utilize an API provided by the debugger to register itself, receive commands from the debugger, or provide commands to the debugger. As an example, the extension component may utilize the debugger's API to command the debugger to create a new debugger thread 406. The extension component may provide logic associated with the newly created debugger thread to communicate with a listener thread 404 or receive communications from the listener thread.

In various embodiments, the facility includes a listener thread 404 associated with the POSIX subsystem. As an example, the listener thread may be provided with a debug version of the POSIX subsystem. In various embodiments, the facility may request the POSIX subsystem to create a listener thread. The listener thread is capable of receiving communications from a debugger thread 406. The listener thread is also capable of invoking various functions of the POSIX subsystem. As an example, the listener thread is capable of determining when the POSIX subsystem takes various actions, such as to create a new process. The listener thread is also capable of initiating communications with the debugger thread.

Figure 5:
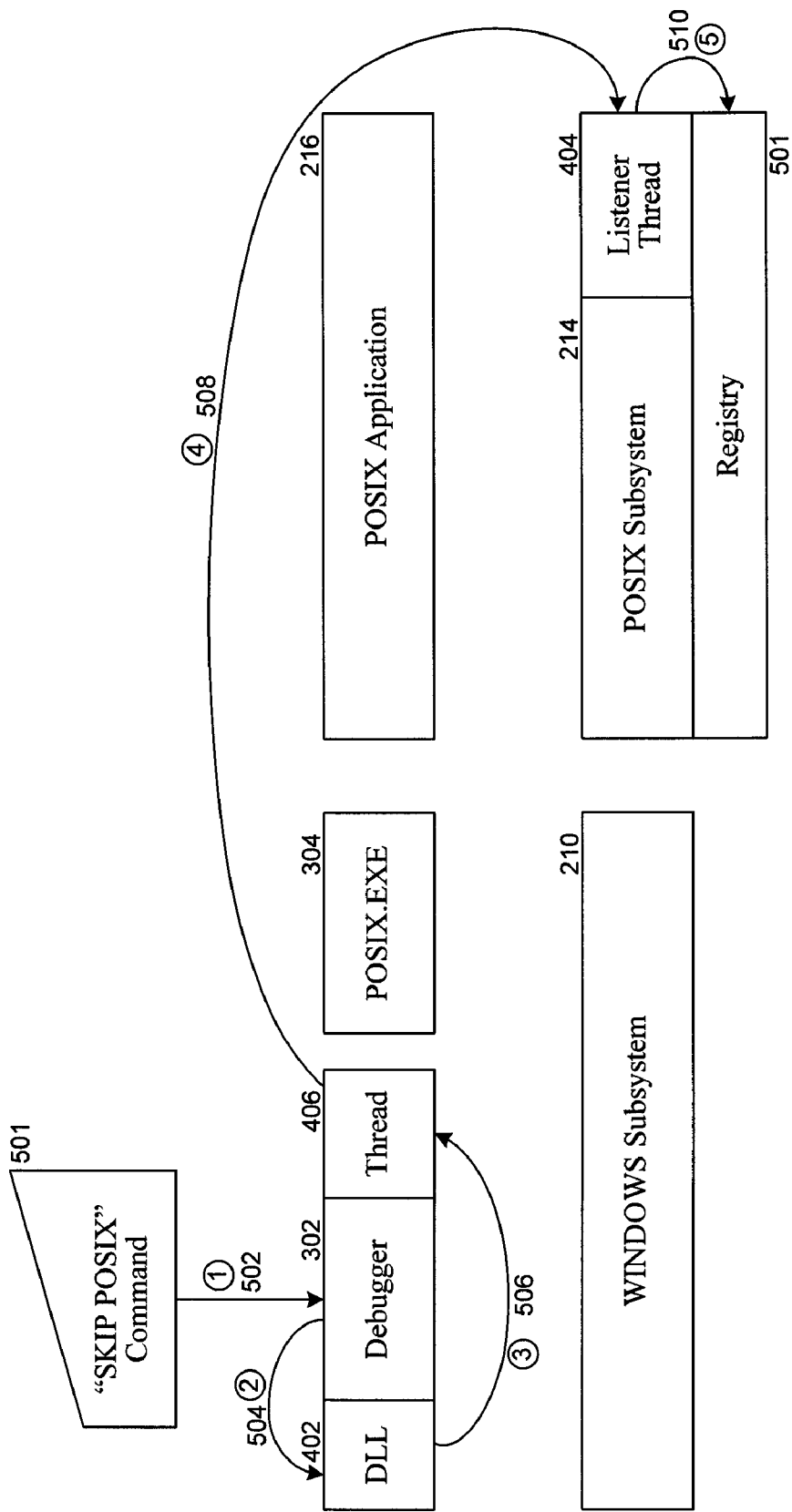
FIGS. 5-8 are operational flow diagrams of the facility in various embodiments.
Figure 6:
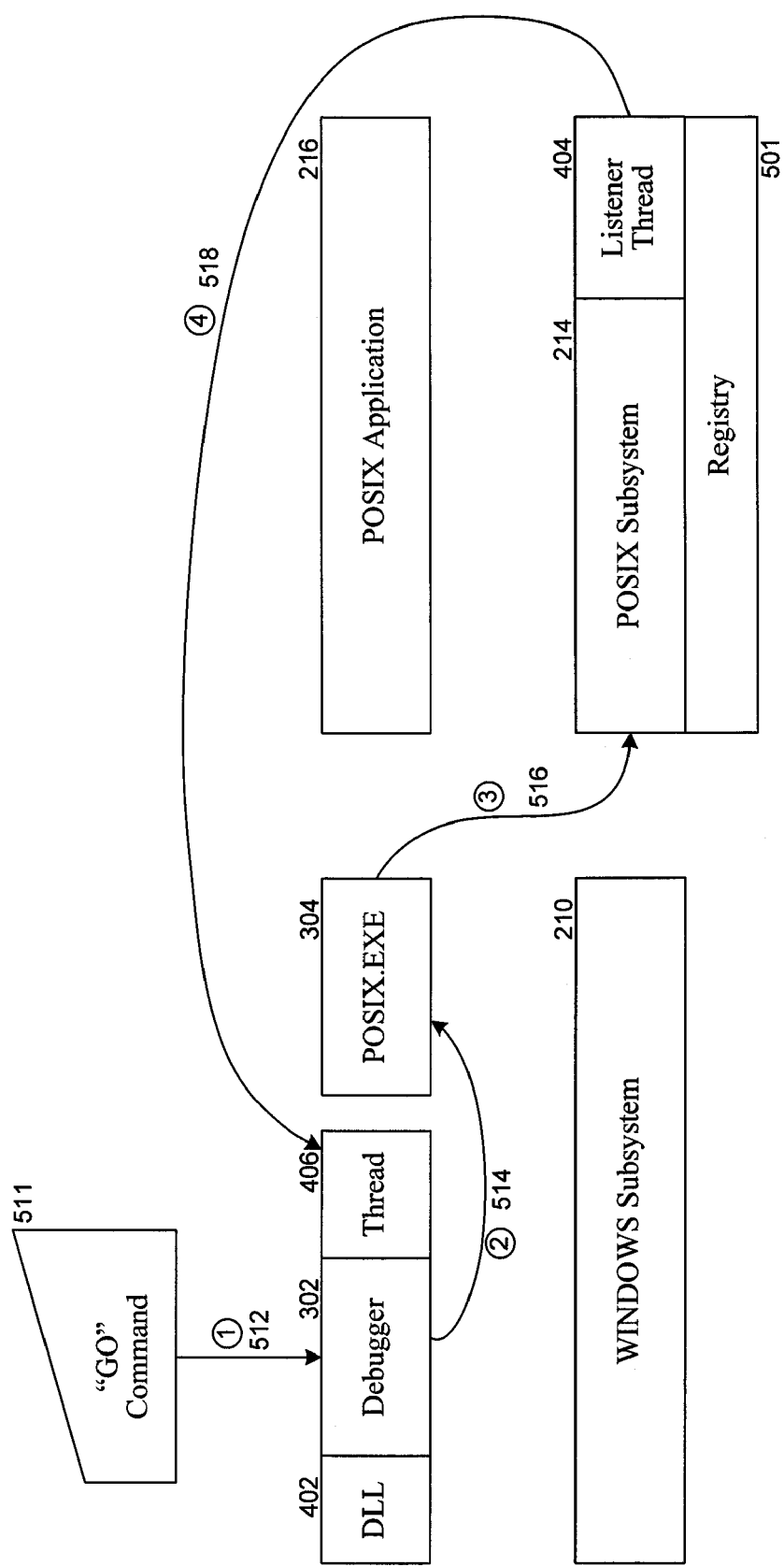
Figure 7:
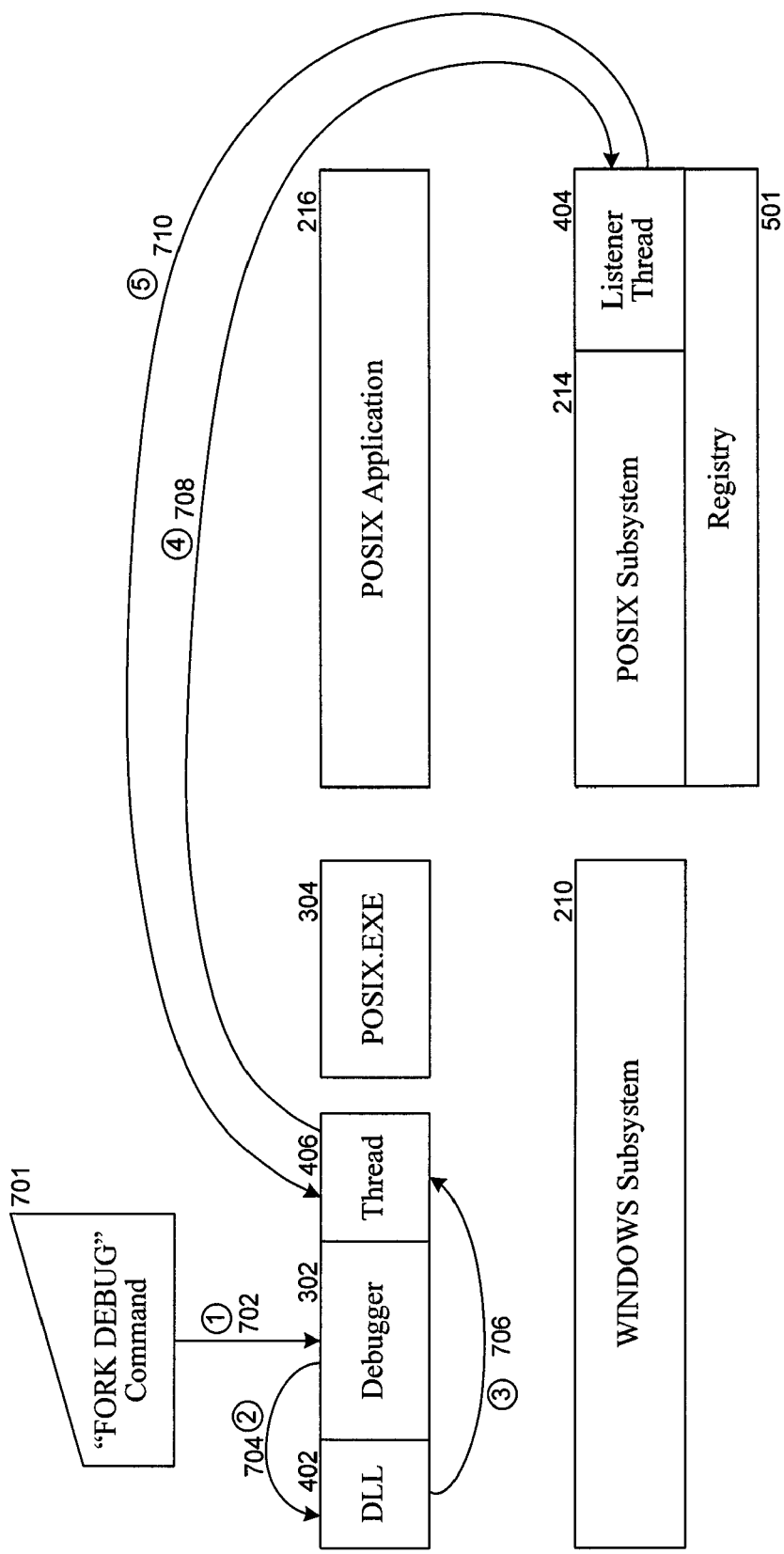
Figure 8:
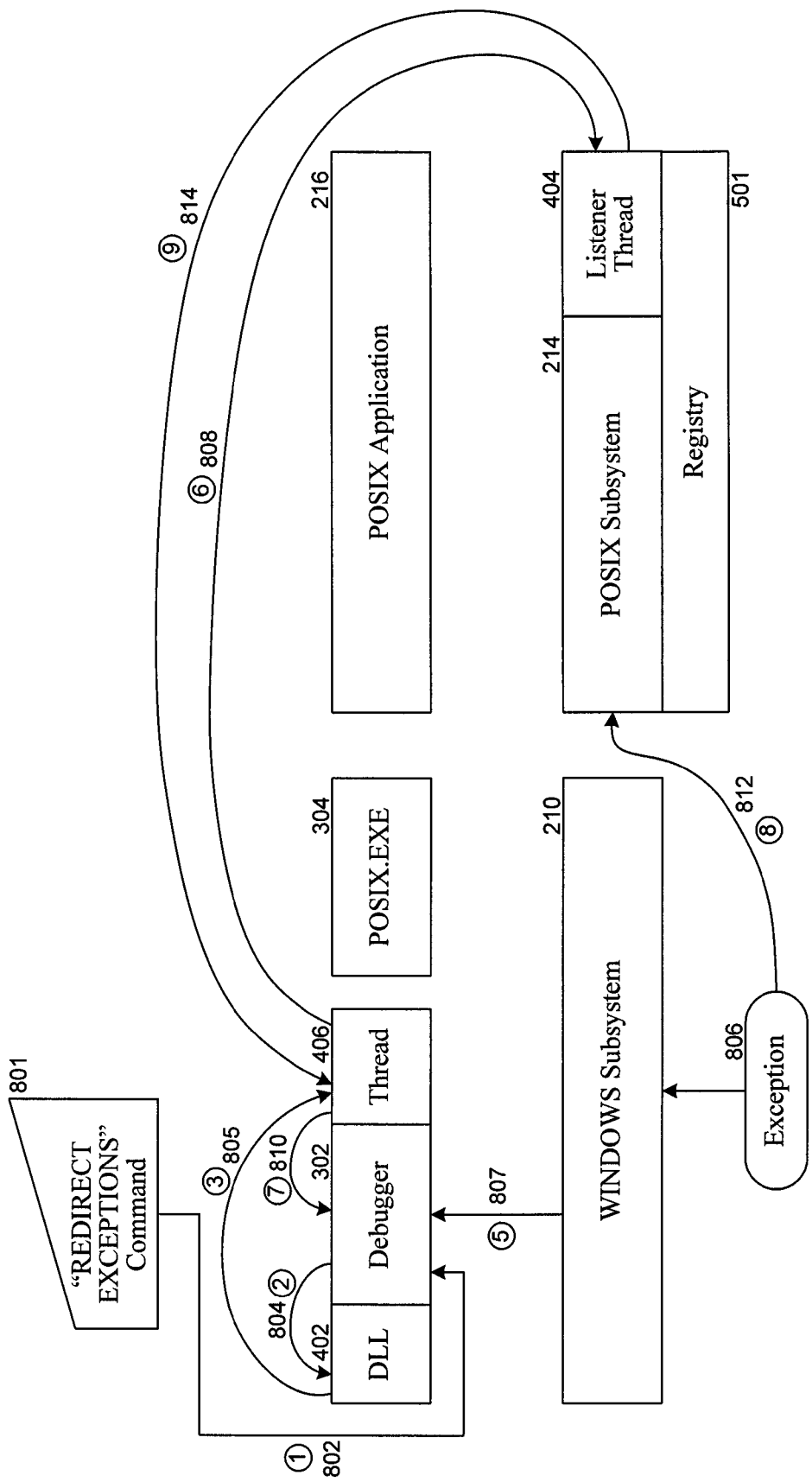

FIGS. 5-8 are operational flow diagrams of the facility in various embodiments. FIGS. 5-6 illustrate operational flows of the facility to enable the debugger to automatically attach to a POSIX application being debugged instead of the POSIX.EXE component. FIG. 7 illustrates operational flows of the facility to enable the debugger to attach to processes of the POSIX subsystem forked by the POSIX application being debugged. FIG. 8 illustrates operational flows of the facility to enable the debugger to redirect exceptions to the POSIX subsystem. These figures are described in greater detail immediately below.

FIG. 5 is an operational flow diagram of the facility in an embodiment. The debugger thread receives a command 501 as illustrated by operational flow 502. The received command indicates that the debugger is to attach to a POSIX application rather than to a POSIX.EXE component. As previously described, when a software developer desires to debug a POSIX application, the debugger may, by default, attach to the POSIX.EXE component. By receiving the command indicating that the debugger is to attach to a POSIX application, the facility overrides the debugger's default behavior. One skilled in the art will recognize that the commands described herein may be provided in various manners, such as by using a command line interface or a graphical user interface. As an example, the software developer may type "SKIP POSIX" in a command line interface. The software developer may also indicate whether fork debugging should be turned on or off, such as by providing an "on" or "off" parameter with the command. Alternatively, the software developer may utilize the graphical user interface of the debugger.

The debugger recognizes that the command is associated with an extension component and provides the command to the extension component, such as by invoking a function of the DLL, as illustrated by operational flow 504.

The extension component then creates a debugger thread, such as by invoking a method of the debugger's API, as illustrated by operational flow 506.

The debugger thread then communicates with the listener thread and provides an indication of the PID associated with the POSIX.EXE component, as illustrated by operational flow 508.

The listener thread adds the indication of the PID associated with the POSIX.EXE component to registry 501, as illustrated by operational flow 510. The registry is associated with the POSIX subsystem and may be utilized to store information relating to various aspects of the subsystem, such as indications of associated threads and processes.

FIG. 6 is an operational flow diagram of the facility in an embodiment. While FIG. 5 illustrates operational flows to configure the facility, FIG. 6 illustrates the operational flow when the facility begins debugging. The debugger receives a command from a user or other software component to begin debugging. As an example, a software developer may set various breakpoints in the application program being debugged and then request the debugger to begin debugging. The software developer may begin debugging by issuing a "GO" command 511 as illustrated by operational flow 512, such as by using a command line interface or a graphical user interface of the debugger.

The debugger provides the POSIX.EXE component with an indication of the application program being debugged, as illustrated by operational flow 514. As an example, the debugger may determine that an application program having a name "app.out" is to be debugged. The debugger may make this determination based on a software developer's input, such as a target of a "make" file or an indication of the application program provided by the software developer using the command line interface or graphical user interface. A "make" file is used by build tools associated with compilers and linkers to determine which files, such as source files, header files, and libraries, are to be used to create the application program.

The POSIX.EXE component provides the indication of the application program being debugged to the POSIX subsystem, as indicated by operational flow 516. The POSIX.EXE component will conventionally do this so that the application program can be started by the POSIX subsystem. This occurs because the POSIX.EXE component behaves as a terminal for the POSIX subsystem. The terminal is designed to receive user input and provide output. The POSIX subsystem creates a new process for starting the application program.

The listener thread detects that the POSIX subsystem has created a new process for the application program being debugged and provides a PID corresponding to the newly created process to the debugger thread, as indicated by operational flow 518. The debugger thread invokes a method of the debugger's API to cause the debugger to attach to the newly created process.

In so doing, the debugger attaches to the application program being debugged instead of the POSIX.EXE component.

FIG. 7 is an operational flow diagram of the facility in an embodiment. The debugger thread receives a command 701 as illustrated by operational flow 702. The received command indicates that the debugger is to attach to every process forked by the application program being debugged. An application program may fork by invoking a fork function of its subsystem, such as "fork( )." The software developer may provide the command 701 using various means. As an example, the software developer may type "FORK DEBUG" in a command line interface. The software developer may also indicate whether fork debugging should be turned on or off, such as by providing an "on" or "off" parameter with the command. Alternatively, the software developer may utilize the graphical user interface of the debugger.

The debugger recognizes that the command is associated with an extension component and provides the command to the extension component, such as by invoking a function of the DLL, as illustrated by operational flow 704.

The extension component then creates a debugger thread, such as by invoking a method of the debugger's API, as illustrated by operational flow 706.

The debugger thread then communicates with the listener thread to indicate that the listener thread should provide indications of forked processes to the debugger, as illustrated by the operational flow 708.

When the application program being debugged forks or an already forked process forks again, the listener thread provides an indication of the forked process's PID to the debugger thread, as indicated by operational flow 710. The debugger thread then invokes a method of the debugger's API to attach the debugger to the forked process.

The debugger may be capable of storing information relating to a process hierarchy. As an example, the debugger may store an indication that a forked process is a child of the process that forked it. The debugger may provide this information to the user, such as by using a user interface.

The subsystem may start new processes that are being debugged in a suspended state. When new processes start in a suspended state, the software developer can perform various actions, such as to set breakpoints, before resuming the suspended process.

In various embodiments, when fork debugging is enabled, the facility also functions when the application program overlays another executable component, such as by invoking an "execve( )" function of its subsystem. When the application program invokes the "execve( )" function, the subsystem may begin executing a different executable component. The facility uses the operational flow outlined above to cause the debugger to attach to this newly started executable component.

In various embodiments, the debugger could attach to every process that is forked by the application program originally being debugged and any additional processes started by these forked processes.

FIG. 8 is an operational flow diagram of the facility in an embodiment. The debugger thread receives a command 801 as illustrated by operational flow 802. The received command indicates that the debugger is to redirect exceptions to the subsystem associated with the application program being debugged. The software developer may provide the command using various means. As an example, the software developer may type "REDIRECT EXCEPTIONS" in a command line interface. The software developer may also indicate whether exception redirection should be turned on or off, such as by providing an "on" or "off" parameter with the command. Alternatively, the software developer may utilize the graphical user interface of the debugger.

The debugger recognizes that the command is associated with an extension component and provides the command to the extension component, such as by invoking a function of the DLL, as illustrated by operational flow 804.

The extension component then creates a debugger thread, such as by invoking a method of the debugger's API, as illustrated by operational flow 805.

Later, when an exception 806 generates, the exception may first be provided to the WINDOWS subsystem. If the WINDOWS subsystem is unable to handle the exception, the exception may be provided to the debugger, as illustrated by operational flow 807.

Upon detecting that the debugger has received an exception, the debugger thread notifies the listener thread that an exception is to be redirected to the POSIX subsystem, as illustrated by operational flow 808.

The debugger thread then requests the debugger to detach from the application program being debugged, as illustrated by operational flow 810.

The exception may then be routed to the POSIX subsystem, as illustrated by operational flow 812. The POSIX subsystem may handle the exception. Alternatively, if the POSIX subsystem is unable to handle the exception, it may provide the exception to the POSIX application program being debugged.

The listener thread next notifies the debugger thread that the POSIX subsystem has received the exception, as illustrated by operational flow 814. The debugger thread then requests the debugger to reattach to the application program being debugged.

The listener thread then notifies the debugger thread that the debugger can reattach to the POSIX application being debugged. Once the debugger reattaches to the application program being debugged, the software developer is then able to debug the application program's logic for handling exceptions.

It will be appreciated by those skilled in the art that the above-described facility may be straightforwardly adapted or extended in various ways. For example, the facility may recognize additional commands useful for debugging an application program for a different subsystem than a subsystem for which the debugger was designed. Different embodiments of the facility may use various different arrangements of modules, and communications schemes for communication between modules. As an example, the debugger thread may utilize local procedure calls to communicate with the listener thread. The listener thread may utilize sockets to communicate with the debugger thread. In various embodiments, the debugger may have multiple extension DLLs that each handle one or more extension commands. In various embodiments, the non-native subsystem (e.g., POSIX) may have multiple listener threads. While the foregoing description makes reference to particular embodiments, the scope of the invention is defined solely by the claims that follow and the elements recited therein.

We claim:

1. A method performed by a computer system having a processor and an operating system with native and non-native subsystems for debugging an application program of the non-native subsystem using a debugger designed for use with the native subsystem, comprising:

receiving an extensibility mechanism for the debugger, the extensibility mechanism configured to invoke an application program interface (API) of the debugger to add a listener thread to the non-native subsystem;

receiving by the processor an indication to debug the application program of the non-native subsystem, wherein the non-native subsystem complies with a first operating system interface specification but the debugger executes in the native subsystem that complies with a second operating system interface specification, wherein the non-native subsystem exposes a different application program interface than the native subsystem, and both the non-native subsystem and the native subsystem operate in the same operating system;

attaching to the application program for use with the non-native subsystem;

receiving an indication that the application program has started a new process, the new process associated with the non-native subsystem;

attaching to an executable component operating in the new process; and upon detecting an exception, indicating to the listener thread to detach and then to reattach after the non-native subsystem has handled the exception.

2. The method of claim 1 wherein the non-native subsystem complies with a portable operating system interface specification.

3. The method of claim 1 wherein the debugger is associated with an integrated development environment.

4. The method of claim 1 wherein the debugger tracks a relationship between the newly started process and the application program.

5. The method of claim 1 wherein the executable component is an instance of the application program.

6. The method of claim 1 including receiving a command to enable fork debugging.

7. The method of claim 1 including attaching to every process started by the application program.

8. The method of claim 7 including attaching to every process started by a process started by the application program.

9. The method of claim 1 wherein the application program starts a new process by issuing a fork command.

10. The method of claim 1 wherein the application program starts a new process by issuing an "execve( )" command.

11. A computer-readable storage medium storing computer-executable instructions for performing a method for debugging an application program of a first subsystem using a debugger designed for use with a second subsystem, the method comprising:

receiving a command to enable fork debugging;

providing the command to an extension component;

receiving a request from the extension component to start a debugger thread, the debugger thread for communicating with a listener thread of the first subsystem wherein the listener thread is started in a process space of the first subsystem by the extension component by invoking an application program interface (API) of the debugger;

starting the debugger thread;

receiving an indication from the debugger thread to attach to a process, the process having been started by the application program and associated with the first subsystem, wherein the first subsystem complies with a portable operating system interface specification but the debugger executes in the second subsystem that complies with a different operating system interface specification, wherein the first subsystem exposes a different application program interface than the second subsystem, and both the first subsystem and the second subsystem operate in the same operating system; and upon detecting an exception, indicating to the listener thread to detach and then to reattach after the first subsystem has handled the exception.

12. The computer-readable medium of claim 11 further comprising providing an indication to a software developer of a process hierarchy illustrating a relationship between the application program and the process started by the application program.

13. The computer-readable medium of claim 11 wherein the debugger thread receives the indication to attach to the process from the listener thread.

14. A system for performing a method for debugging an application program of a non-native subsystem using a debugger designed for use with a native subsystem, comprising:

a processor and memory;

a debugger component that is designed for use with the native subsystem, wherein the native subsystem complies with a first operating system interface specification;

an extension component associated with the debugger component for extending the debugger component and causing the debugger component to start a debugger thread; and a non-native subsystem having a listener thread for communicating with the debugger thread, wherein the non-native subsystem complies with a second operating system interface specification that is different from the first operating system interface specification, the native subsystem exposing a different application program interface (API) than the non-native subsystem, both the first subsystem and the second subsystem operate in the same operating system, and the listener thread is instructed to detach and then to reattach after the non-native subsystem has handled a detected exception.

15. The system of claim 14 wherein the extension component receives a command from the debugger to enable fork debugging and requests the debugger to start the listener thread.

16. The system of claim 14 wherein the listener thread provides to the debugger thread an indication that the application program of the non-native subsystem has started a process on the non-native subsystem.

17. The system of claim 16 wherein when the debugger thread receives from the listener thread an indication that the application program of the non-native subsystem has started a process on the non-native subsystem, the debugger thread requests the debugger to attach to an application program associated with the started process.

18. The system of claim 14 wherein the native subsystem and the non-native subsystem are associated with a common operating system.

* * * * *